US011095157B2

(12) United States Patent
Fujiwara et al.

(10) Patent No.: US 11,095,157 B2
(45) Date of Patent: Aug. 17, 2021

(54) WIRELESS POWER-TRANSMITTING SYSTEM

(71) Applicant: IHI CORPORATION, Tokyo (JP)

(72) Inventors: Eiichiro Fujiwara, Tokyo (JP); Susumu Tokura, Tokyo (JP)

(73) Assignee: IHI CORPORATION, Tokyo (JP)

(*) Notice: Subject to any disclaimer, the term of this patent is extended or adjusted under 35 U.S.C. 154(b) by 20 days.

(21) Appl. No.: 16/577,671

(22) Filed: Sep. 20, 2019

(65) Prior Publication Data

US 2020/0014248 A1 Jan. 9, 2020

Related U.S. Application Data

(63) Continuation of application No. 15/153,841, filed on May 13, 2016, now Pat. No. 10,454,310, which is a (Continued)

(30) Foreign Application Priority Data

Nov. 18, 2013 (JP) ................. 2013-237918
Jan. 14, 2014 (JP) ................. 2014-004642

(51) Int. Cl.
*H02J 50/12* (2016.01)
*H02J 7/02* (2016.01)
*B60L 53/124* (2019.01)
*B60L 53/122* (2019.01)
*B60L 53/126* (2019.01)
*H02J 50/60* (2016.01)

(52) U.S. Cl.
CPC ............ *H02J 50/12* (2016.02); *B60L 53/122* (2019.02); *B60L 53/124* (2019.02); *B60L 53/126* (2019.02); *H02J 7/025* (2013.01); *H02J 50/60* (2016.02)

(58) Field of Classification Search
CPC . H02J 50/12; H02J 7/025; H02J 50/60; B60L 53/122; B60L 53/126; B60L 53/124; Y02T 90/12; Y02T 90/14; Y02T 10/7072; Y02T 10/70
USPC ......................................... 307/104
See application file for complete search history.

(56) References Cited

U.S. PATENT DOCUMENTS 3,450,138 A * 6/1969 Gunyou ................. A01D 45/02
 460/43
7,773,906 B2 8/2010 Matsumoto et al.
(Continued)

FOREIGN PATENT DOCUMENTS

CN 101093374 A 12/2007
DE 202009009693 U1 11/2010
(Continued)

*Primary Examiner* — Toan T Vu
(74) *Attorney, Agent, or Firm* — Volpe Koenig

(57) ABSTRACT

A wireless power-transmitting system which wirelessly transmits electric power by making a power-transmitting coil and a power-receiving coil face each other includes: a cover which is slidable between a closing position at which the cover covers an area above a facing surface of the power-transmitting coil and an open position at which the cover is retracted from the area above the facing surface; and a hook member which makes a foreign object placed on the cover move together with the cover sliding from the closing position to the open position.

10 Claims, 6 Drawing Sheets

Related U.S. Application Data continuation of application No. PCT/JP2014/080348, filed on Nov. 17, 2014.

(56) References Cited

U.S. PATENT DOCUMENTS

| | | |
|---|---|---|
| 2007/0001662 A1 | 1/2007 | Suzuki |
| 2007/0292158 A1 | 12/2007 | Matsumoto et al. |
| 2010/0065352 A1 | 3/2010 | Ichikawa |
| 2012/0200151 A1 | 8/2012 | Obayashi et al. |
| 2013/0015699 A1 | 1/2013 | Mita |
| 2013/0175987 A1* | 7/2013 | Amma ............ B60L 53/126 320/108 |
| 2013/0249299 A1 | 9/2013 | Shijo et al. |
| 2013/0249682 A1* | 9/2013 | Van Wiemeersch .... B60L 50/16 340/426.24 |
| 2014/0111019 A1 | 4/2014 | Roy |
| 2014/0239735 A1 | 8/2014 | Abe et al. |

FOREIGN PATENT DOCUMENTS

| | | |
|---|---|---|
| EP | 0874378 A2 | 10/1998 |
| JP | 58-063607 A | 4/1983 |
| JP | 06-311659 A | 11/1994 |
| JP | 0874378 A2 * | 10/1998 |
| JP | 2004-328808 A | 11/2004 |
| JP | 2007-194931 A | 8/2007 |
| JP | 2010-066466 A | 3/2010 |
| JP | 2010-173749 A | 8/2010 |
| JP | 2011-125153 A | 6/2011 |
| JP | 2011-234514 A | 11/2011 |
| JP | 2012-085472 A | 4/2012 |
| JP | 2012-147634 A | 8/2012 |
| JP | 2012-165498 A | 8/2012 |
| JP | 2013-021886 A | 1/2013 |
| JP | 2013-046492 A | 3/2013 |
| JP | 2013-048511 A | 3/2013 |
| JP | 2013-059249 A | 3/2013 |
| JP | 2013-201867 A | 10/2013 |
| WO | 2009/081115 A1 | 7/2009 |
| WO | 2013/035853 A1 | 3/2013 |

* cited by examiner

WIRELESS POWER-TRANSMITTING SYSTEM

This application is a continuation of U.S. patent application Ser. No. 15/153,841, filed May 13, 2016, which is a Continuation of International Application No. PCT/JP2014/080348, filed on Nov. 17, 2014, claiming priority based on Japanese Patent Application No. 2013-237918, filed on Nov. 18, 2013, and Japanese Patent Application No. 2014-004642, filed on Jan. 14, 2014, the contents of which are incorporated herein by reference in their entirety.

TECHNICAL FIELD

Embodiments described herein relates to a wireless power-transmitting system.

BACKGROUND ART

In recent years, a wireless power-transmitting system which wirelessly transmits electric power by making a power-transmitting coil and a power-receiving coil face each other has attracted attention. That is, in recent years, a wireless power-transmitting system has been known in which a coil on the power-supplying side (a power-transmitting coil) is installed on the ground or buried so as to be flush with the surface of the ground, and an electric vehicle provided with a coil on the power-receiving side (a power-receiving coil) is stopped above the power-transmitting coil, and thus electric power is wirelessly supplied from the power-transmitting coil to the power-receiving coil.

The wireless power-transmitting system adopts a magnetic field resonance method or an electromagnetic induction method, and application to the power transmission of a vehicle such as an electric vehicle is expected. However, in the wireless power-transmitting system, if a foreign object exists between the power-transmitting coil and the power-receiving coil, power-transmitting efficiency falls, and if the foreign object is metal such as an empty can, there is a possibility that heat may be generated under the influence of a magnetic field.

That is, if a foreign object composed of an electrically conductive body or a magnetic body such as metal enters between the power-transmitting coil and the power-receiving coil of an automobile (a vehicle), an eddy current is generated in the foreign object, and thus the temperature of the foreign object rises due to Joule heat generation. Then, the temperature of the power-transmitting coil also rises according to a rise in the temperature of the foreign object. Further, a magnetic field which the power-transmitting coil generates is weakened by the foreign object, and therefore, the transmission (power transmission) efficiency is considerably reduced.

Patent Document 1 discloses a power-transmitting device provided with a power transmission part which transmits electric power by using a magnetic field, and a foreign object removing operation part which removes a foreign object in the vicinity of a power transmission path of the electric power transmission. The foreign object removing operation part removes the foreign object by using at least one operation of the tilt, the rotation, and the vibration of an accommodation part which accommodates the power transmission part.

Patent Document 2 discloses an electric vehicle provided with a sweeping part which sweeps out a foreign object which already exist on a power-transmitting coil before the start of charging. The sweeping part is disposed on the bottom surface of the electric vehicle, is made to be movable between an accommodated state and a sweepable state, and moves to the sweepable state when the electric vehicle has approached a power-supplying part.

Patent Document 3 discloses an electric machine system provided with a domed housing which prevents an animal or a foreign object from being placed on a ground-installed transducer. The domed housing includes an outer surface having a plurality of points disposed at a plurality of heights, in which at least one of the plurality of points has a first height and other points of the plurality of points have the respective heights lower than the first height.

Further, in, for example, Patent Document 4, a charging device which has a charging surface made so as to be an inclined surface having an angle with respect to a horizontal plane or a vertical surface and prevents heat generation due to a foreign object is known.

Patent Document 5 discloses a wireless power-transmitting system in which at least one of a power-transmitting coil and a power-receiving coil is covered with an openable and closable winding-type roll screen, and thus the surfaces (operation surfaces) of the power-transmitting coil and the power-receiving coil are prevented from becoming dirty.

Patent Document 6 discloses a wireless power-transmitting system in which a foreign object placed on an upward convex conical member which covers a power-transmitting coil and is formed so as to come into close contact with a member covering a power-receiving coil, by moving upward at the time of wireless power transmission, falls along a slope of the conical shape according to the movement of the power-transmitting coil.

Patent Document 7 discloses a wireless power-transmitting system in which if the existence of a foreign object on a power-transmitting surface is detected during wireless power transmission, an electric current having a specific frequency is supplied to one of two power-transmitting coils and thus two different variation magnetic fields by two electric currents having different frequencies are generated from the two power-transmitting coils, and as a result, the power-transmitting surface vibrates at a third frequency.

Patent Document 8 discloses a device that cleans a lens or a CCD by driving a brush by alternately bending a polymer actuator from side to side.

Patent Document 9 discloses a paper transport device with a foreign object sticking prevention function which vibrates a transport roller by using a super-magnetostrictive element, and an image forming device provided with the paper transport device.

CITATION LIST

Patent Document

[Patent Document 1] Japanese Unexamined Patent Application, First Publication No. 2013-21886

[Patent Document 2] Japanese Unexamined Patent Application, First Publication No. 2013-48511

[Patent Document 3] Japanese Unexamined Patent Application, First Publication No. 2013-59249

[Patent Document 4] Japanese Unexamined Patent Application, First Publication No. 2011-234514

[Patent Document 5] Japanese Unexamined Patent Application, First Publication No. 2012-147634

[Patent Document 6] Japanese Unexamined Patent Application, First Publication No. 2012-085472

[Patent Document 7] Japanese Unexamined Patent Application, First Publication No. 2013-046492

[Patent Document 8] Japanese Unexamined Patent Application, First Publication No. 2007-194931

[Patent Document 9] Japanese Unexamined Patent Application, First Publication No. 2010-173749

SUMMARY

Technical Problem

The techniques of Patent Documents 1 and 3 are to cause the tilt or the like of the accommodation part accommodating the power transmission part, and therefore, it is not possible to obtain a large tilt in a narrow space between an electric vehicle and the ground, and thus there is a possibility that depending on a foreign object, removal may become insufficient. Further, for example, in a case where a foreign object is gum with wrapping foil, or the like, thereby having an adhesive property, it is not possible to remove the foreign object by any of tilt, rotation, and vibration.

In the technique of Patent Document 2, the sweeping part has to be mounted on an electric vehicle, and thus it is necessary to add a device to the electric vehicle.

Further, for example, in a wireless power-transmitting system for a vehicle, it is difficult to reliably drop a foreign object by simply tilting the power-transmitting surface.

The present disclosure has an object to provide a wireless power-transmitting system in which it is possible to reliably remove a placed foreign object from between a power-transmitting coil and a power-receiving coil, in view of the above circumstances.

Solution to Problem

In a first aspect of the present disclosure, a wireless power-transmitting system which wirelessly transmits electric power by making a power-transmitting coil and a power-receiving coil face each other, includes: a cover which is slidable between a closing position at which the cover covers an area above a facing surface of at least one of the power-transmitting coil and the power-receiving coil and an open position at which the cover is retracted from the area above the facing surface; and a foreign object accompanying member configured to make a foreign object placed on the cover move together with the cover sliding from the closing position to the open position.

In the first aspect of the present disclosure, the facing surface of the power-transmitting coil or the power-receiving coil is covered with the cover, and the foreign object placed on the cover is moved together with the cover which slides, by the foreign object accompanying member, and thus at the time of wireless power transmission, the foreign object is removed from above the facing surface. In the first aspect of the present disclosure, the foreign object is not dropped from the cover by tilt or the like and is retracted along with the cover from above the facing surface, and therefore, it is possible to eliminate the uncertainty of the foreign object removal.

In a second aspect of the present disclosure, the foreign object accompanying member has a hook member which is provided at the cover and protrudes further upward from a placement surface on which the foreign object is placed.

In the second aspect of the present disclosure, the hook member is provided at the cover, and the hook member catches the foreign object placed on the placement surface of the cover, whereby it is possible to make the foreign object move together with the cover which slides.

In a third aspect of the present disclosure, the wireless power-transmitting system further includes winding member configured to wind the cover into a roll shape.

In the third aspect of the present disclosure, the cover is wound into a roll shape, whereby it is not necessary to secure a large space at a slide destination of the cover, and thus it is possible to attain space saving.

In a fourth aspect of the present disclosure, the wireless power-transmitting system further includes a folding member configured to fold the cover into a bellows shape.

In the fourth aspect of the present disclosure, the cover is folded into a bellows shape, whereby it is not necessary to secure a large space at a slide destination of the cover, and thus it is possible to attain space saving.

In a fifth aspect of the present disclosure, the foreign object accompanying member has sticking member configured to stick the foreign object to the cover.

In the fifth aspect of the present disclosure, the sticking member is provided at the cover, and the foreign object is stuck to the cover by the sticking member, whereby it is possible to make the foreign object move together with the cover which slides.

In a sixth aspect of the present disclosure, the wireless power-transmitting system further includes a blade member which scrapes off the foreign object stuck to the cover, at an accompanying destination of the foreign object.

In the sixth aspect of the present disclosure, the foreign object stuck to the cover is scraped off by the blade member, whereby it is possible to prevent the foreign object from returning onto the facing surface.

In a seventh aspect of the present disclosure, the wireless power-transmitting system further includes a foreign object collection member configured to recover the foreign object at an accompanying destination of the foreign object.

In the seventh aspect of the present disclosure, the foreign object placed on the cover is recovered by the foreign object collection member, whereby it is possible to prevent the foreign object from returning onto the facing surface.

In an eighth aspect of the present disclosure, a wireless power-transmitting system includes: a power-transmitting coil which wirelessly transmits electric power to a movable body; a cover which covers the power-transmitting coil; and a vibration part which is connected to the cover and vibrated by a magnetic flux generated in the power-transmitting coil, thereby vibrating the cover.

In a ninth aspect of the present disclosure, in accordance with the eighth aspect, an upper surface of the cover is made to be an inclined surface which outwardly descends.

In a tenth aspect of the present disclosure, in accordance with the eighth or ninth aspect, the vibration part is provided with a vibration part coil which generates electric power by receiving the magnetic flux generated in the power-transmitting coil, and a vibrator including an electrically conductive polymer actuator which is connected to the vibration part coil and also connected to the cover, and is vibrated by the electric power generated in the vibration part coil.

In an eleventh aspect of the present disclosure, in accordance with the eighth or ninth aspect, the vibration part is formed by a vibrator made of magnetostrictive material.

According to the present disclosure, a wireless power-transmitting system is obtained in which it is possible to reliably remove a foreign object placed between a power-transmitting coil and a power-receiving coil.

DESCRIPTION OF EMBODIMENTS

Hereinafter, embodiments of the present disclosure will be described with reference to the drawings.

First Embodiment

Figure 1:
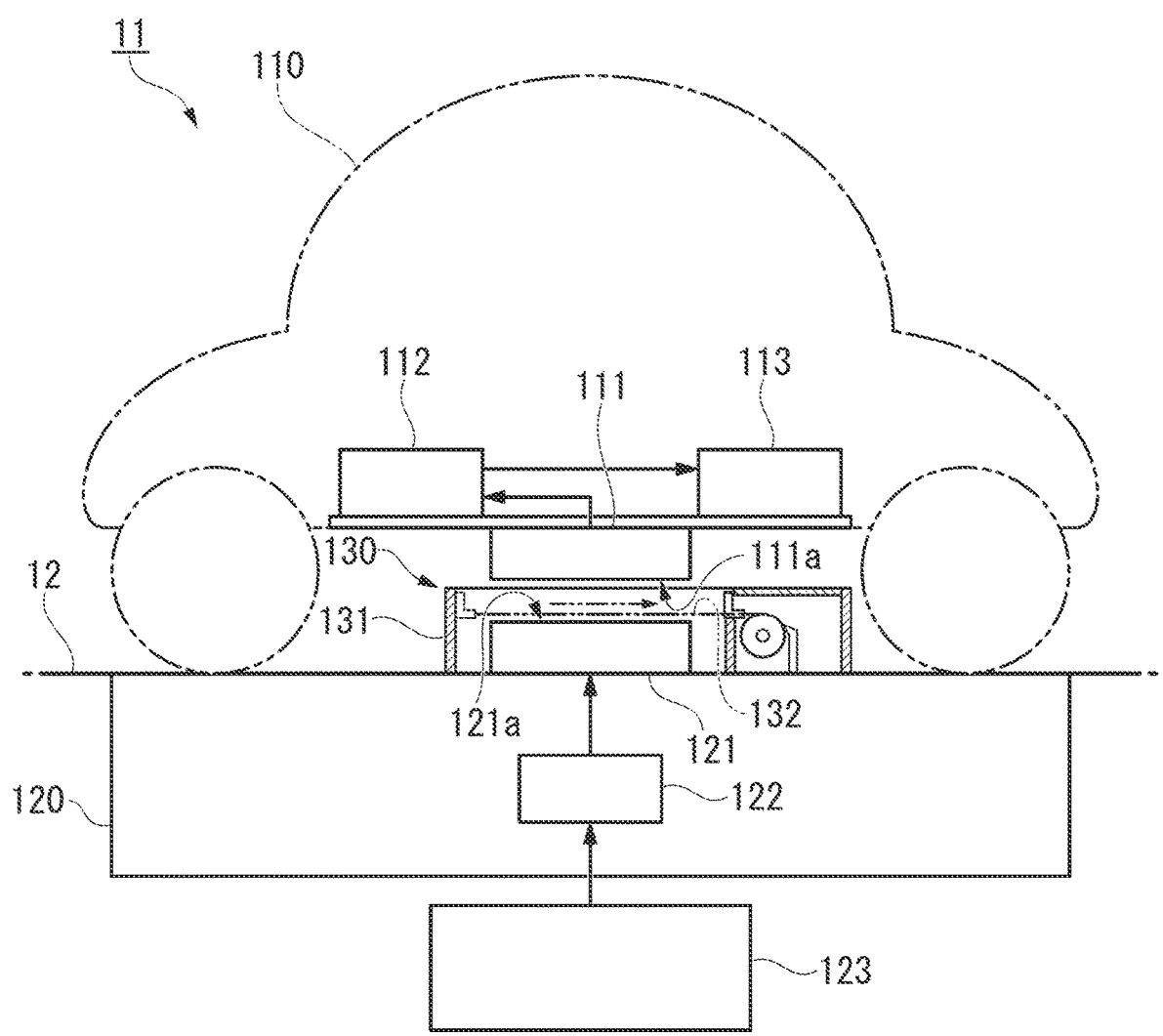
FIG. 1 is an overall configuration diagram of a wireless power-transmitting system in a first embodiment of the present disclosure.

FIG. 1 is an overall configuration diagram of a wireless power-transmitting system 11 in a first embodiment of the present disclosure.

The wireless power-transmitting system 11 is a system which wirelessly transmits electric power between a power-receiving device and a power-transmitting device, at least one of which is movable, and in this embodiment, as shown in FIG. 1, a vehicle 110 is the power-receiving device and a stop station 120 at which the vehicle 110 stops is the power-transmitting device. The vehicle 110 is movable with respect to the stop station 120 provided on a road surface 12.

The vehicle 110 is provided with a power-receiving coil 111. On the other hand, the stop station 120 is provided with a power-transmitting coil 121. The power-receiving coil 111 has a facing surface 111a capable of facing the power-transmitting coil 121 on the ground side and is provided at a bottom portion of the vehicle 110. The power-receiving coil 111 is electromagnetically combined with the power-transmitting coil 121, thereby wirelessly receiving AC power.

The wireless power transmission from the power-transmitting coil 121 to the power-receiving coil 111 in the wireless power-transmitting system 11 of this embodiment is performed based on a magnetic field resonance method. That is, a resonance capacitor (not shown) that configures a resonance circuit is connected to each of the power-transmitting coil 121 to the power-receiving coil 111. Further, for example, the capacitance of the resonance capacitor is set so that the resonance frequency of a power-transmitting resonance circuit which includes the power-transmitting coil 121 and the resonance capacitor and the resonance frequency of a power-receiving resonance circuit which includes the power-receiving coil 111 and the resonance capacitor become the same frequency.

The vehicle 110 is provided with a power-receiving circuit 112 and a battery 113, in addition to the power-receiving coil 111.

The power-receiving circuit 112 is a power conversion circuit which converts received power received from the power-transmitting coil 121 into DC power and supplies the DC power to the battery 113. That is, the power-receiving circuit 112 charges the battery 113 by supplying a charging current corresponding to the charging state of the battery 113 to the battery 113.

The battery 113 is a secondary battery capable of storing sufficient power as a driving power source of the vehicle 110 and is, for example, a lithium ion secondary battery, a nickel-hydrogen secondary battery, or the like.

On the other hand, the power-transmitting coil 121 has a facing surface 121a capable of facing the power-receiving coil 111 and is provided on the road surface 12. The stop station 120 is provided with a power-transmitting circuit 122 and an external power source 123, in addition to the power-transmitting coil 121.

The power-transmitting circuit 122 is a power conversion circuit which converts power which is supplied from the external power source 123 into AC power corresponding to a resonance frequency of the wireless power transmission of the magnetic field resonance method and supplies the AC power to the power-transmitting coil 121.

The external power source 123 is, for example, a commercial power source, a solar battery, wind power generation, or the like and supplies power to the power-transmitting circuit 122.

The wireless power-transmitting system 11 has a foreign object removing device 130 which removes a foreign object placed between the power-transmitting coil 121 and the power-receiving coil 111, at the time of the wireless power transmission.

The foreign object removing device 130 of this embodiment has a housing 131 which surrounds the power-transmitting coil 121, and a cover 132 which provides a lid to the housing 131, thereby covering the power-transmitting coil 121.

Figure 2:
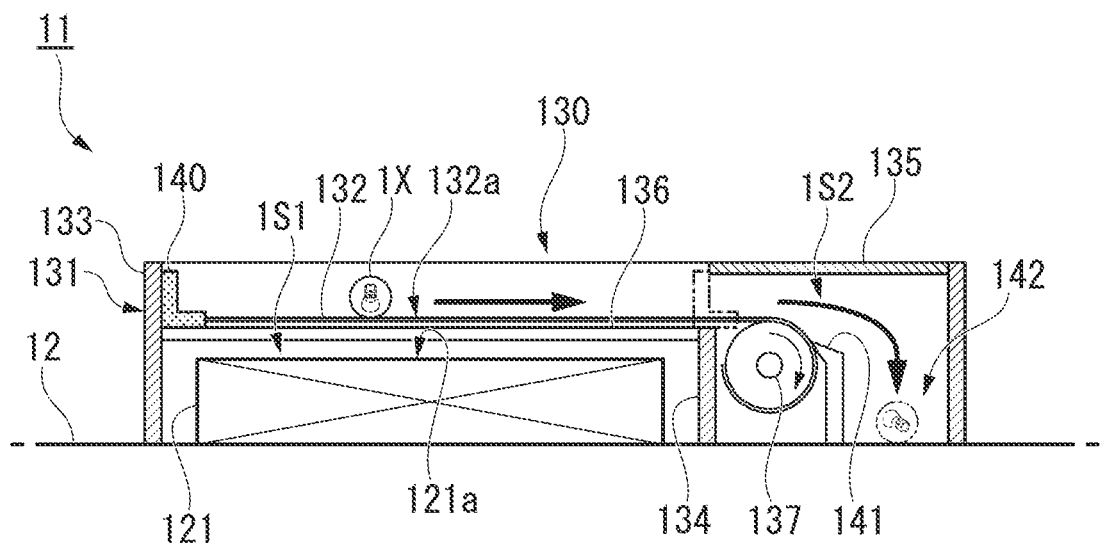
FIG. 2 is a configuration diagram of a foreign object removing device in the first embodiment of the present disclosure.

FIG. 2 is a configuration diagram of the foreign object removing device 130 in the first embodiment of the present disclosure. Reference numeral 1X denotes an example of a foreign object made of metal.

The housing 131 has a wall portion 133 having a substantially rectangular shape when viewed in a top view, and the inside of the wall portion 133 is partitioned into two spaces 1S1 and 1S2 by a partition portion 134. The space 1S1 is covered by the cover 132, and the space 1S2 is covered by a roof portion 135.

The power-transmitting coil 121 is accommodated in the space 1S1. The housing 131 functions as an electromagnetic shield of an EMC (Electro Magnetic Compatibility) countermeasure of the power-transmitting coil 121. Further, the wall portion 133 is provided to be erect more than the height of the power-transmitting coil 121 from the road surface 12, and thus the housing 131 also functions as a physical shield which prevents the infiltration of a foreign object from the side to the inside. Further, the partition portion 134 is lower than the wall portion 133. However, the partition portion 134 is formed of the same material as the wall portion 133 and does not electromagnetically affect the space 1S2. Further, the roof portion 135 may also be formed of the same material as the wall portion 133.

The cover 132 is configured so as to be able to slide between a closing position (shown by a solid line in FIG. 2) at which the cover 132 covers an area above the facing surface 121a of the power-transmitting coil 121, and an open position (shown by a two-dot chain line in FIG. 2, and refer to FIG. 1) at which the cover 132 is retracted from the area above the facing surface 121a of the power-transmitting coil 121. In this embodiment, a slide guide 136 is provided on the inside surface of the wall portion 133, and the cover 132 is slidable in a horizontal direction along the slide guide 136.

The cover 132 is formed so as to be able to be wound into a roll shape by a winder 137 (winding member) provided in the space 1S2. The cover 132 of this embodiment is formed in the form of a sheet having a predetermined rigidity and slides between the closing position and the open position by the winding/unwinding of the winder 137. Further, at the time of the unwinding, the cover 132 may be pulled by a string (not shown). A surface 132a (a placement surface) of the cover 132 may be subjected to surface processing (for example, polytetrafluoroethylene processing) making a foreign object difficult to stick.

A hook member 140 (is an example of foreign object accompanying member) is provided at the cover 132. The hook member 140 is integrally mounted on a rear end portion of the cover 132 which is wound into a roll shape. Both end portions of the hook member 140 are supported on the slide guide 136 and is slidable in the horizontal direction along with the cover 132. Further, the slide guide 136 is provided at substantially the same height as the top of the partition portion 134, and the hook member 140 is slidable without colliding with the partition portion 134.

The hook member 140 makes a foreign object placed on the cover 132 move together with the cover 132 sliding from the closing position to the open position. The hook member 140 protrudes further upward than the surface 132a of the cover 132, on which a foreign object is placed. The hook member 140 of this embodiment is an L-shaped hook, and its upper end portion protrudes upward to a position at which the upper end portion is stopped by hitting the roof portion 135. The hook member 140 functions as a stopper of the winding of the cover 132 by being stopped by hitting the roof portion 135. Further, the cover 132 and the hook member 140 are disposed near the power-transmitting coil 121 in a winding state, and therefore, the cover 132 and the hook member 140 may be formed of a non-magnetic and non-electrically conductive material.

A blade member 141 is provided in the space 1S2. The blade member 141 scrapes off the foreign object stuck to the cover 132. As the foreign object, in addition to a foreign object (an empty can or the like) which does not have an adhesive property, there is a foreign object (gum with wrapping foil, or the like) having an adhesive property. Further, there is also a case where a foreign object which does not have an adhesive property is placed on a foreign object having an adhesive property. The blade member 141 physically removes such a foreign object.

A tip portion of the blade member 141 is disposed in contact with or in proximity to the surface 132a of the cover 132 wound into a roll shape on the winder 137. As shown in FIG. 2, in a case of bringing the tip portion of the blade member 141 into contact with the surface 132a of the cover 132, the blade member 141 may be formed of an elastically deformable material so as to be able to be deformed to follow the cover 132 in which a diameter increases according to the number of rotations. The blade member 141 is provided to be erect from the road surface 12 and prevents the scraped-off foreign object from infiltrating the winder 137.

A foreign object collection part 142 (foreign object collection member) is provided in the space 1S2. The foreign object collection part 142 has a size capable of accommodating a foreign object which is assumed to be placed on the cover 132. The foreign object collection part 142 of this embodiment is formed of the wall portion 133 and the blade member 141 and the upper portion thereof is covered with the roof portion 135 so that the recovered foreign object is not blown away by wind or the like. Further, the roof portion 135 is provided so as to be able to be opened and closed with respect to the wall portion 133 by a hinge mechanism (not shown), and it is possible to take out the recovered foreign object by opening the roof portion 135.

Next, a power transmission operation of the wireless power-transmitting system 11 configured in this manner and a foreign object removing operation of the foreign object removing device 130 will be described.

The wireless power-transmitting system 11 performs wireless power transmission between the vehicle 110 and the stop station 120, as shown in FIG. 1. With respect to the power transmission, a magnetic field resonance method is adopted for power transmission between the power-transmitting coil 121 and the power-receiving coil 111. The power transmission by the magnetic field resonance method is resistant to the positional misalignment of the resonance coils provided in both the vehicle 110 and the stop station 120 and can realize high efficiency and long-distance power transmission.

In the wireless power transmission, if a foreign object exists between the power-transmitting coil 121 and the power-receiving coil 111, the formation of a magnetic field is disturbed, and thus power-transmitting efficiency falls, and if the foreign object is metal such as an empty can, there is a possibility that heat may be generated under the influence of a magnetic field. For this reason, the wireless power-transmitting system 11 has the foreign object removing device 130 which removes the foreign object placed between the power-transmitting coil 121 and the power-receiving coil 111, at the time of the wireless power transmission. As in this embodiment, in a case where the power-transmitting coil 121 is installed on the ground, there is a case where a foreign object is placed on the facing surface 121a of the power-transmitting coil 121.

The foreign object removing device 130 has the cover 132 which covers the area above the facing surface 121a of the power-transmitting coil 121, as shown in FIG. 2. When the wireless power transmission is not performed, the cover 132 is located at the closing position above the facing surface 121a of the power-transmitting coil 121, thereby preventing the foreign object from being directly placed on the facing surface 121a. Further, the infiltration of a foreign object from the side of the power-transmitting coil 121 due to wind or the like is prevented by the housing 131 which also functions as an electromagnetic shield.

When the wireless power transmission is performed, the cover 132 is wound by the winder 137, thereby sliding to the open position at which the cover 132 is retracted from the area above the facing surface 121a of the power-transmitting coil 121. At this time, a foreign object (for example, an empty can) placed on the surface 132a of the cover 132 tries to tumble down the rear end portion of the cover 132 due to an inertia force without following the slide of the cover 132. However, the hook member 140 is provided at the rear end portion of the cover 132. The hook member 140 protrudes further upward than the surface 132a on which the foreign object is placed, and catches the foreign object placed on the surface 132a, whereby it is possible to make the foreign object move together with the cover 132 which slides.

The cover 132 is wound until the hook member 140 is stopped by hitting the roof portion 135, and thus is retracted from the area above the facing surface 121a of the power-transmitting coil 121. At the same time, the foreign object placed on the cover 132 also moves together with the cover 132 which slides, and is removed from the area above the facing surface 121a of the power-transmitting coil 121. In this manner, the foreign object removing device 130 retracts the foreign object along with the cover 132 from the area above the facing surface 121a without falling off the foreign object from the cover 132 by tilt or the like, and therefore, it is possible to reliably remove the foreign object from between the power-transmitting coil 121 and the power-receiving coil 111 regardless of the nature of the foreign object, and thus it is possible to eliminate the uncertainty of the foreign object removal.

Further, the cover 132 slides in a direction intersecting with a direction in which the power-transmitting coil 121 and the power-receiving coil 111 face each other, and therefore, a space in a height direction is not required, and thus it is possible to accommodate the foreign object removing device 130 in a narrow space between the vehicle 110 and the road surface 12.

Further, in this embodiment, the winder 137 which winds the cover 132 into a roll shape is provided. According to this configuration, the winder 137 winds the cover 132 into a roll shape, and therefore, it is not necessary to secure a large space at a slide destination (the right side of FIG. 2) of the cover 132, and thus it is possible to attain space saving in a planar area of the foreign object removing device 130.

The foreign object falls off from the cover 132 which is wound into a roll shape, and is collected in the foreign object collection part 142. In this way, even if the cover 132 is unwound, the foreign object does not return onto the area above the facing surface 121a. Further, in this embodiment, even if the foreign object is stuck to the cover 132, it is possible to scrape off the foreign object by the blade member 141, and thus it is possible to collect the foreign object in the foreign object collection part 142. Further, the foreign object collection part 142 is away from the power-transmitting coil 121, thereby being unaffected by a magnetic field due to an electromagnetic shield such as the partition portion 134. For this reason, even if the recovered foreign object is metal, there is no case where heat is generated, and even if heat is generated, there is no case where the power-transmitting coil 121 is damaged by heat.

In this manner, the wireless power-transmitting system 11 which wirelessly transmits electric power by making the power-transmitting coil 121 and the power-receiving coil 111 face each other, according to this embodiment described above, has the cover 132 which is slidable between the closing position at which the cover 132 covers the area above the facing surface 121a of the power-transmitting coil 121 and the open position at which the cover 132 is retracted from the area above the facing surface 121a, and the hook member 140 which makes the foreign object placed on the cover 132 move together with the cover 132 sliding from the closing position to the open position. For this reason, a wireless power-transmitting system 11 is obtained in which it is possible to reliably remove the foreign object placed on the cover 132 from between the power-transmitting coil 121 and the power-receiving coil 111.

Second Embodiment

Next, a second embodiment of the present disclosure will be described. In the following description, constituent portions equal or equivalent to those in the above-described embodiment are denoted by the same reference numerals and descriptions thereof are simplified or omitted.

Figure 3:
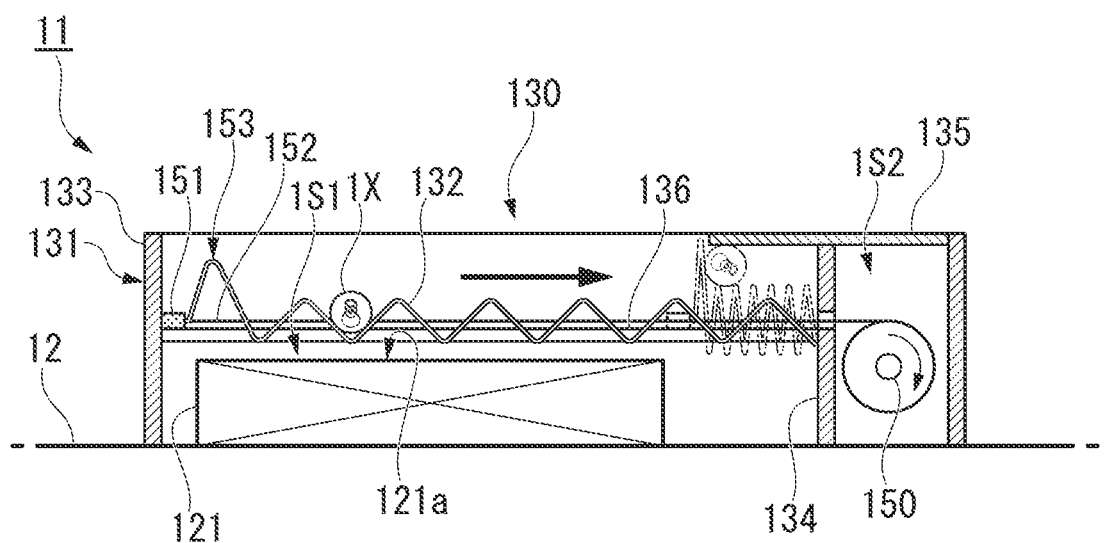
FIG. 3 is a configuration diagram of a foreign object removing device in a second embodiment of the present disclosure.

FIG. 3 is a configuration diagram of the foreign object removing device 130 in the second embodiment of the present disclosure.

In the second embodiment, as shown in FIG. 3, the configuration of the cover 132 is different from that of the above-described embodiment.

The cover 132 of the second embodiment is configured so as to be able to slide between the closing position (shown by a solid line in FIG. 3) at which the cover 132 covers the area above the facing surface 121a of the power-transmitting coil 121 and the open position (shown by a two-dot chain line in FIG. 3) at which the cover 132 is retracted from the area above the facing surface 121a of the power-transmitting coil 121. In this embodiment, the slide guide 136 is provided on the inside surface of the wall portion 133, and the cover 132 is configured so as to be able to slide in the horizontal direction along the slide guide 136.

The cover 132 is formed so as to be able to be folded into a bellows shape by a string winder 150 (folding member) provided in the space 1S2. The cover 132 of this embodiment is formed by folding a sheet material having a spring property into a bellows shape, and a guide piece 151 which is supported on the slide guide 136 is mounted on a tip portion. A string 152 is connected to the guide piece 151, and the string winder 150 winds the string 152, whereby the cover 132 slides to the open position, and the cover 132 slides to the closing position due to the spring restoring force of the cover 132.

The cover 132 has a mountain portion 153 (is an example of the foreign object accompanying member) which is partially greatly folded. The mountain portion 153 is disposed adjacent to the guide piece 151 and is formed so as to be higher than other mountain portions of the cover 132. The mountain portion 153 makes a foreign object placed on the cover 132 move together with the cover 132 sliding from the closing position to the open position. The mountain portion 153 protrudes upward to a position at which the mountain portion 153 is stopped by hitting the roof portion 135, when the mountain portion 153 has been folded. The mountain portion 153 is stopped by hitting the roof portion 135, thereby functioning as a stopper of the folding of the cover 132.

According to the second embodiment having the above-described configuration, the facing surface 121a of the power-transmitting coil 121 is covered with the cover 132, and the foreign object placed on the cover 132 moves together with the cover 132 which slides by the mountain portion 153, thereby it is possible to remove the foreign object from the area above the facing surface 121a at the time of the wireless power transmission. In this manner, in the second embodiment, similar to the above-described embodiment, the foreign object is retracted along with the cover 132 from the area above the facing surface 121a, and therefore, it is possible to eliminate the uncertainty of the foreign object removal.

Further, in the second embodiment, the cover 132 is folded into a bellows shape, whereby it is not necessary to secure a large space at a slide destination of the cover 132, and thus it is possible to attain space saving. Further, the mountain portion 153 is formed by making one of the mountain portions of the bellows large, whereby the foreign object accompanying member can be integrated with the cover 132, and thus it is possible to attain a reduction in the number of parts and improvement in an assembling property. Further, in the second embodiment, if the cover 132 is closed, the foreign object also returns to the original position. However, if a foreign object does not exist between the power-transmitting coil 121 and the power-receiving coil 111 at the time of the wireless power transmission, a problem does not occur.

The embodiments of the present disclosure have been described above with reference to the drawings. However, the present disclosure is not limited to the embodiments described above. The shapes, the combination, or the like of the respective constituent members shown in the embodiments described above are examples and various changes can be made based on design requirements or the like within a scope of the present disclosure.

For example, in the embodiments described above, as the foreign object accompanying member, the hook member 140 or the mountain portion 153 is an exemplary example. However, there is no limitation to this configuration. For example, as the foreign object accompanying member, sticking member that sticks a foreign object to the cover 132 may be adopted. According to this configuration, a structure causing a height, like the hook member 140 or the mountain portion 153, may not be provided, thereby contributing to space saving. As the sticking member, for example, an adhesive sheet which is stuck to the surface 132a of the cover 132 shown in FIG. 1 is also acceptable, and if the foreign object is a magnetic body, a magnetic sheet or the like which attracts the foreign object by a magnetic force is also acceptable.

Further, for example, in the embodiments described above, description is made of transmitting electric power to the bottom portion of the vehicle 110 by transmitting electric power from the stop station 120 on the ground. However, the directionality of the power transmission does not matter. For example, power may be transmitted from a wall to a lateral portion, a front portion, or a rear portion of the vehicle 110 or may be transmitted from a ceiling to a roof portion of the vehicle 110.

Further, for example, in the embodiments described above, a case where the power-receiving coil 111 is provided at the vehicle 110 and the power-transmitting coil 121 is provided at the stop station 120 is exemplary example. However, there is no limitation to this configuration, and for example, a configuration may be made in which the power-receiving coil 111 is provided at the stop station 120 and the power-transmitting coil 121 is provided at the vehicle 110. Therefore, the foreign object removing device 130 may be provided in the power-receiving coil 111 and the foreign object removing devices 130 may be provided in both the power-transmitting coil 121 and the power-receiving coil 111. Further, the present disclosure can be applied even if at least one of the power-transmitting device and the power-receiving device is a vehicle or is a movable body or the like such as a ship, a submarine, or aircraft.

Further, for example, the present disclosure particularly exerts an effect by combination with the wireless power transmission by the magnetic field resonance method in which large positional misalignment can be permitted. However, combination with wireless power transmission of another method such as an electromagnetic induction method is also acceptable.

Further, for example, substitutions or the combination of the configurations of the respective embodiments described above can be appropriately made.

Next, third to fifth embodiments of the present disclosure will be described.

In addition, in the following drawings, in order to show each member in a recognizable size, the scale of each member is appropriately changed.

Third Embodiment

Figure 4:
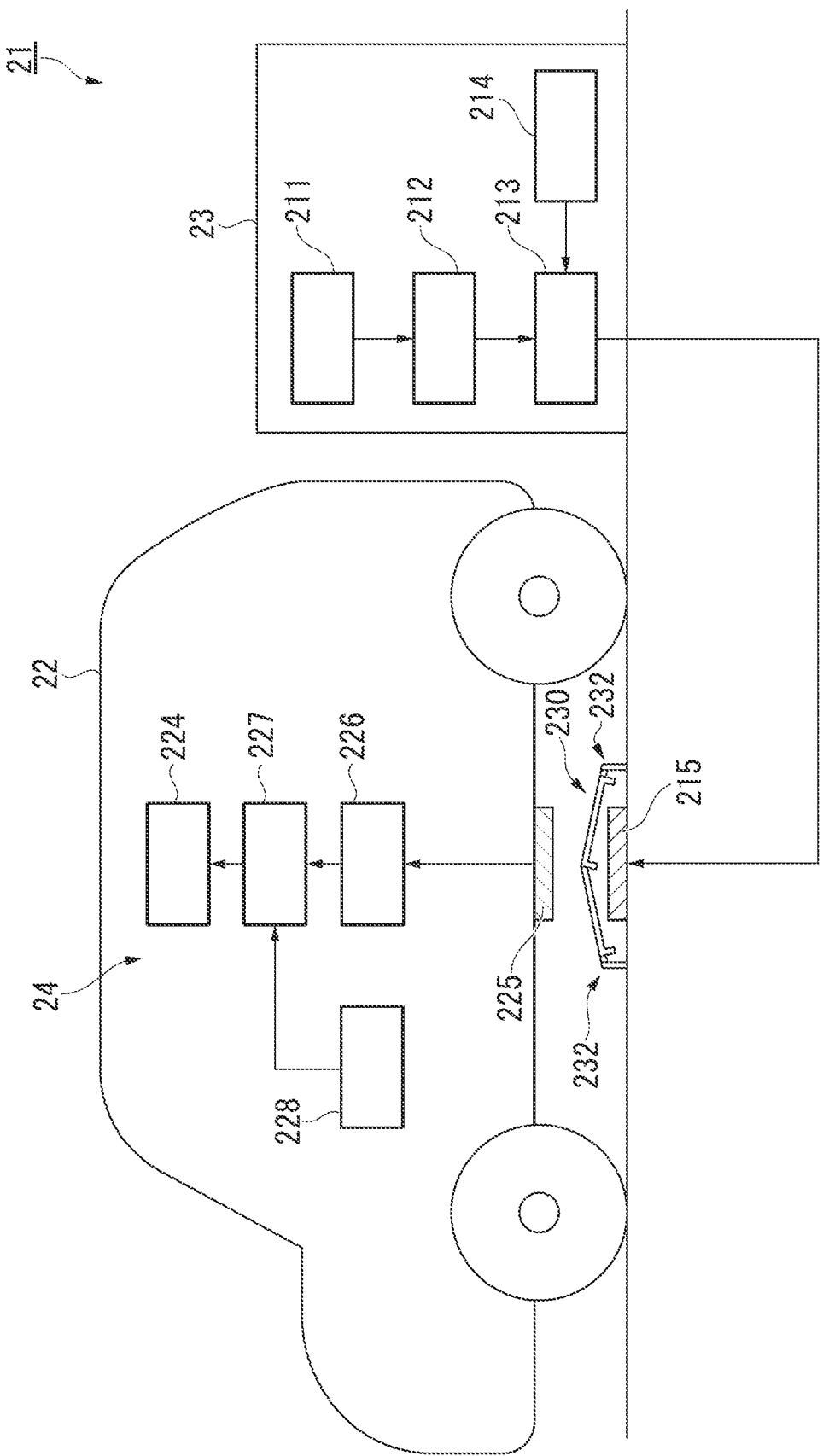
FIG. 4 is a block diagram showing the configuration of a main section of a wireless power-transmitting system according to the present disclosure.

FIG. 4 is a block diagram showing the configuration of a main section of a wireless power-transmitting system 21 according to the present disclosure. Reference numeral 21 in FIG. 4 denotes a wireless power-transmitting system, and the wireless power-transmitting system 21 is a system (an apparatus) that charges a battery mounted on a vehicle (a movable body) such as an electric vehicle or a hybrid vehicle.

The wireless power-transmitting system 21 is provided with a wireless power-transmitting system 23 installed on the ground, and a power-receiving device 24 provided in a vehicle 22 (a movable body). The wireless power-transmitting system 23 is a third embodiment in the wireless power-transmitting system according to the present disclosure, is installed on the surface of the ground, and can wirelessly transmit power (power for charging a battery 224) to the power-receiving device 24 of the vehicle 22 when the vehicle 22 traveling on the ground is stopped in a predetermined positional relationship (a positional relationship in which an electromagnetic coupling circuit (described later) is formed).

The wireless power-transmitting system 23 is provided with a power source 211, a rectifying circuit 212, a power-transmitting circuit 213, a power-transmitting control unit 214, a power-transmitting coil 215 (a power-transmitting resonator), and the like and performs various controls required to generate power suitable for wireless power transmission to the power-receiving device 24 and perform the wireless power transmission to the power-receiving device 24.

The power source 211 is a power source which supplies electric power required to generate power to be transmitted to the vehicle 22, for example, is a power source which supplies three-phase AC power having a voltage of 200 [V]. Further, the power source 211 is not limited to a three-phase AC power source and may be a power source which supplies single-phase AC power, such as a commercial AC power source.

The rectifying circuit 212 is a circuit which rectifies AC power which is supplied from the power source 211, thereby converting the AC power into DC power. Further, as the power source 211, it is also possible to use a DC power source such as a fuel cell or a solar battery, and in this case, the rectifying circuit 212 can be omitted.

The power-transmitting circuit 213 wirelessly transmits electric power which is supplied from the rectifying circuit 212, to the vehicle 22 through the electromagnetic coupling circuit which is formed by the power-transmitting coil 215 and a power-receiving coil 225 which is provided at the vehicle 22. Specifically, the power-transmitting circuit 213 is provided with a resonance capacitor and configures a power-transmitting resonance circuit along with the power-transmitting coil 215. Further, the power-transmitting circuit 213 converts the DC power from the rectifying circuit 212 into AC power (high-frequency power) having a higher frequency than the AC power of the power source 211 and outputs the AC power to the power-transmitting coil 215, under the control of the power-transmitting control unit 214.

The power-transmitting control unit 214 controls the power-transmitting circuit 213, thereby generating power to be supplied to the power-receiving device 24 in the power-transmitting circuit 213. The power-transmitting control unit 214 is provided with a CPU (central processing unit), a memory, or the like and performs the above-described various controls, based on a control program prepared in advance.

The power-transmitting coil 215 is a coil which wirelessly transmits the AC power which is supplied from the power-transmitting circuit 213, to the vehicle 22, as described above, and is installed on the ground or buried so as to be flush with the surface of the ground. The power-transmitting coil 215 is formed by, for example, a helical coil having a predefined coil shape size, and the upper surface side of the power-transmitting coil 215 is covered with a cover 230. The details of the cover 230 will be described later. Further, the power-transmitting coil 215 may be provided integrally with an accommodation body which is formed of a non-magnetic material such as plastic. The power-transmitting coil 215 wirelessly transmits electric power to the power-receiving device 24 by generating a magnetic field corresponding to the AC power (high-frequency power) which is supplied from the power-transmitting circuit 213. Further, the power-transmitting coil 215 may be formed by a so-called solenoid type coil in which a winding axis direction is oriented in the horizontal direction.

The vehicle 22 is an automobile which is driven by a driver, thereby traveling on a road, and is, for example, an electric vehicle or a hybrid vehicle which is provided with a traveling motor as a power generation source, and is provided with the power-receiving device 24, as shown in FIG. 4. In addition, although omitted in FIG. 4, the vehicle 22 is provided with configurations necessary for traveling, such as an engine, a traveling motor, a steering wheel, and a brake.

The power-receiving device 24 is provided with the power-receiving coil 225, a power-receiving circuit 226, a charging circuit 227, the battery 224, and a power-receiving control unit 228. The power-receiving coil 225 is composed of a helical coil having substantially the same coil diameter as the power-transmitting coil 215. Further, the power-receiving coil 225 may be provided integrally with an accommodation body which is formed of a non-magnetic material such as plastic. The power-receiving coil 225 is provided at a bottom portion of the vehicle 22 in a posture in which a coil axis is in an up-and-down direction (a vertical direction) so as to be able to face the power-transmitting coil 215. Both ends of the power-receiving coil 225 are connected to input terminals of the power-receiving circuit 226, and the power-receiving coil 225 generates an electromotive force if a magnetic field of the power-transmitting coil 215 acts, and outputs the generated electromotive force to the power-receiving circuit 226. Further, the power-receiving coil 225 may be formed by a so-called solenoid type in which a winding axis direction is oriented in the horizontal direction.

The power-receiving circuit 226 receives electric power (AC power) which is wirelessly transmitted through the electromagnetic coupling circuit which is formed by the power-transmitting coil 215 and the power-receiving coil 225, converts the received electric power into DC power, and outputs the DC power to the charging circuit 227. The power-receiving circuit 226 is provided with a resonance capacitor and configures a power-receiving resonance circuit along with the power-receiving coil 225. Further, the capacitance of the resonance capacitor of the power-receiving circuit 226 is set so that a resonance frequency of the power-receiving resonance circuit becomes the same frequency as the resonance frequency of the power-transmitting resonance circuit described above.

Input terminals of the charging circuit 227 are connected to output terminals of the power-receiving circuit 226 and output terminals of the charging circuit 227 are connected to input terminals of the battery 224, and thus the charging circuit 227 charges the electric power (DC power) from the power-receiving circuit 226 to the battery 224. The battery 224 is a rechargeable battery (for example, a secondary battery such as a lithium ion battery or a nickel-hydrogen battery) mounted on the vehicle 22 and supplies power to the traveling motor (not shown) or the like. The power-receiving control unit 228 is provided with a CPU, a memory, or the like and controls the charging circuit 227, based on a power-receiving control program prepared in advance.

Figure 5A:
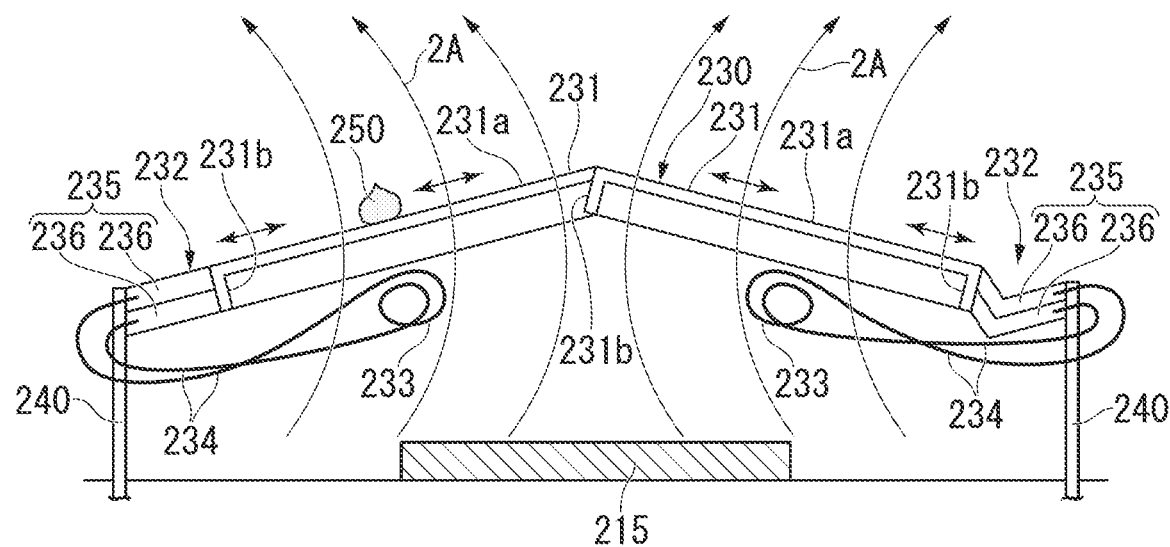
FIG. 5A is a side view of a main section of a third embodiment of the wireless power-transmitting system according to the present disclosure.
Figure 5B:
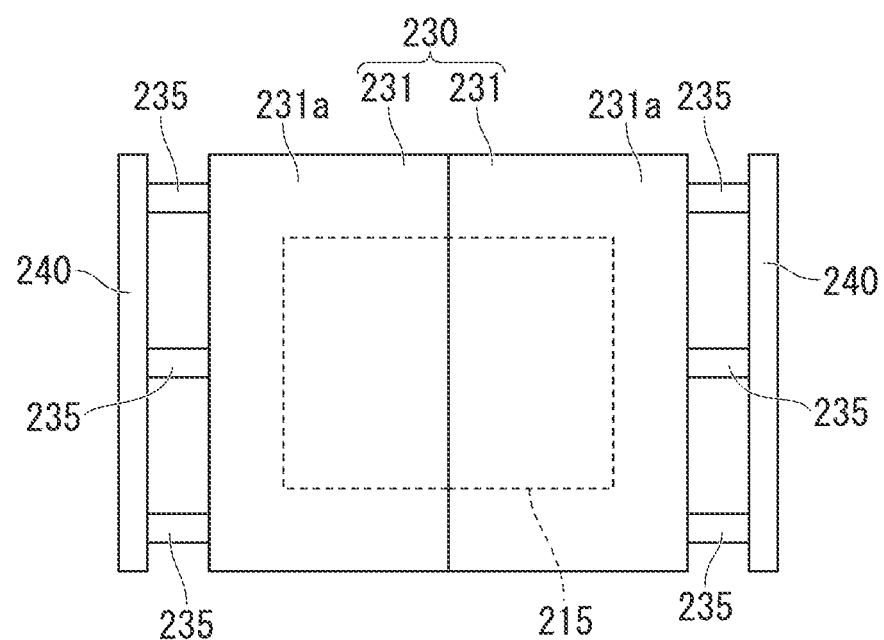
FIG. 5B is a top view of a main section of a third embodiment of the wireless power-transmitting system according to the present disclosure.

Further, in this embodiment, the cover 230 which covers the upper surface side of the power-transmitting coil 215 described above is formed by a pair of cover members 231 and 231 made of resin, as shown in FIGS. 5A and 5B, and a vibration part 232 is connected to each of the cover members 231 and 231.

The cover member 231 is formed by a cover main body 231*a* having a rectangular shape when viewed in a top view, as shown in FIG. 5B, and a side plate portion 231*b* which descends from a side edge portion of the cover main body 231*a*, as shown in FIG. 5A.

The cover members 231 and 231 are formed in a mountain shape when viewed from the side so that the sides being in contact with each other are higher and the opposite sides to the higher sides are lower. That is, the upper surface of the cover 230 is the highest at a central portion and is made to have an inclined surface which gradually and outwardly descends (that is, an inclined surface which gradually descends toward the outside thereof). The angle of inclination of the cover member 231 is not particularly limited and is set to be an angle at which a foreign object 250 placed on the upper surface is easily guided to the outside (the lower side) by vibration of the cover member 231 and falls from the cover member 231, as will be described later. Specifically, the angle of inclination is set to be in a range of 10 degrees to 40 degrees.

The vibration part 232 is provided with a vibration part coil 233 which generates electric power by receiving a magnetic field generated in the power-transmitting coil 215, and a vibrator 235 which is connected to the vibration part coil 233 through a wire 234 and also connected to the cover member 231.

The vibration part coil 233 is disposed between the power-transmitting coil 215 and the cover member 231 and therefore, is disposed in a space which is sandwiched between the power-transmitting coil 215 and the power-receiving coil 225, between the surface of the ground and the vehicle 22.

The vibration part coil 233 is a helical type coil obtained by spirally winding a conducting wire such as a round wire or a flat wire in a plane. Then, the vibration part coil 233 is disposed below the cover member 231 by an appropriate holding jig (not shown) or the like so that a wound surface (a plane orthogonal to a coil axis) thereof intersects with a magnetic flux 2A which is generated when wireless power transmission is performed from the power-transmitting coil 215 to the power-receiving coil 225, in a state of being nearer to orthogonality. Due to such a configuration, the vibration part coil 233 generates electric power by receiving the magnetic flux 2A from the power-transmitting coil 215 and supplies AC power (high-frequency power) to the vibrator 235 through the wire 234.

Further, with respect to the disposition of the vibration part coil 233, the vibration part coil 233 may be disposed so as to partially deviate from a space sandwiched between the power-transmitting coil 215 and the power-receiving coil 225. The vibration part coil 233 is disposed to partially deviate from the space, whereby it is possible to receive a portion of a leakage magnetic flux which leaks to the outside without being transmitted to the power-receiving coil 225, apart from the magnetic flux 2A toward the power-receiving coil 225 from the power-transmitting coil 215, and convert it into electric power. Therefore, it is possible to increase energy efficiency.

In the vibration part coil 233 provided on one of the pair of cover members 231 and 231, and the vibration part coil 233 provided on the side of the other cover member 231, winding directions of the respective conducting wires are reversed to each other. That is, for example, the vibration part coil 233 on the side of one cover member 231 is formed in anticlockwise winding and the vibration part coil 233 on the side of the other cover member 231 is formed in clockwise winding.

In this embodiment, the vibrator 235 is formed by an electrically conductive polymer actuator 236 which vibrates due to electric power generated in the vibration part coil 233. The electrically conductive polymer actuator 236 is formed by an element which performs bending and stretching, and is formed by polypyrrole (PPy) 236a molded in, for example, a strip shape (an elongated rectangular plate shape), and a Kapton tape 236b affixed to the surface on one side of the polypyrrole 236a, as shown in FIG. 6.

Figure 6:
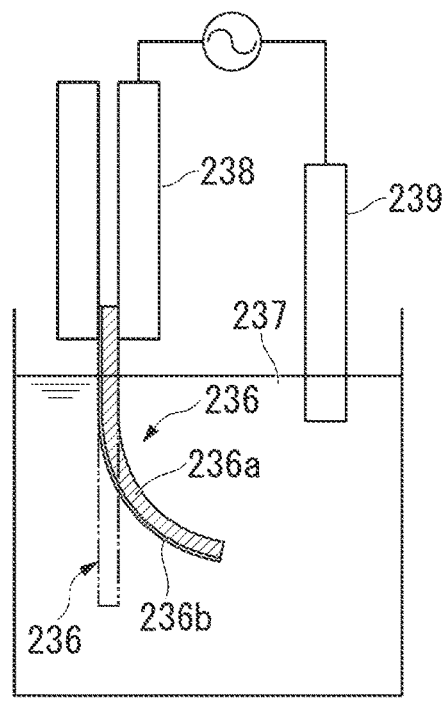
FIG. 6 is a schematic diagram of an electrically conductive polymer actuator.

In the conductive polymer actuator 236 having such a configuration, if voltage is applied between a working electrode 238 which is connected to the polypyrrole 236a immersed in a solution 237 and an opposite electrode 239 immersed in a solution 237 as shown in FIG. 6, ions in the solution 237 come in and out from only the surface on the polypyrrole 236a side and volume relatively expands and contracts, as compared with the Kapton tape 236b side, whereby the element performs the bending and stretching. Further, as the solution 237, for example, a solution in which sodium p-toluenesulfonic acid (p-TSNa) is dissolved in deionized water is used.

Further, the vibrator 235 of this embodiment is formed by superimposing a pair of the conductive polymer actuators 236 and 236 on each other in a state of coming into contact with each other with the Kapton tape 236b side as the inside. Further, as shown in FIG. 5A, one end of the vibrator 235 is held by a support plate 240 erected on the ground, and the end face of the other end comes into contact with and is connected to the outer surface of the side plate portion 231b on the outside of the cover member 231. Further, for example, three vibrators 235 are connected to the cover member 231, as shown in FIG. 5B. However, the number of vibrators 235 which are connected to the cover member 231 is arbitrarily set according to the size of the cover member 231 or the ability of the vibrator 235. In a case where, for example, only one vibrator 235 is connected to the cover member 231, a coil spring may be interposed between the support plate 240 and the cover member 231 in order to stably hold the cover member 231. Further, the cover member 231 may be supported by a support member (not shown) separate from the support plate 240.

As shown in FIG. 5A, a working electrode (not shown) is provided on the support plate 240 side of the vibrator 235 and the wire 234 which is connected to one end of the vibration part coil 233 is connected to the working electrode.

Further, a solution containing cylinder (not shown) is fitted onto an intermediate portion of the vibrator 235, and the vibrator 235 is held so that the intermediate portion thereof can slide with respect to the solution containing cylinder. Then, a tip portion of the vibrator 235 is extracted from the solution containing cylinder and comes into contact with the outer surface of the side plate portion 231b on the outside of the cover member 231, as described above.

The solution containing cylinder is filled with a solution (not shown) in a liquid-tight manner, and an opposite electrode (not shown) is disposed in the solution. The wire 234 which is connected to the other end of the vibration part coil 233 is connected to the opposite electrode. Further, as described above, the vibrator 235 is formed by the pair of conductive polymer actuators 236. However, a working electrode (not shown) of the vibrator 235 functions as a working electrode to the respective polypyrroles 236a in the pair of conductive polymer actuators 236. Further, the opposite electrode disposed in the solution containing cylinder also serves as a common electrode for the pair of conductive polymer actuators 236.

Due to such a configuration, ions in the solution 237 come in and out from both surfaces composed of the polypyrrole 236a, whereby the entire volume expands and contracts, and thus the vibrator 235 is displaced in a length direction. That is, the vibrator 235 extends and contracts in the length direction.

Therefore, in the vibration part 232, the vibration part coil 233 generates electric power by a magnetic field which is formed in the power-transmitting coil 215, and the electric power is supplied to the vibrator 235 through the wire 234, whereby the vibrator 235 extends and contracts in the length direction thereof, thereby vibrating the cover member 231. That is, the vibration part coil 233 receives a magnetic field (the magnetic flux 2X) corresponding to AC power (high-frequency power) which is produced from the power-transmitting coil 215, thereby supplying high-frequency AC power to the vibrator 235, whereby the vibrator 235 repeats the expansion and contraction of the entire volume at a high speed, and thus the length in the length direction thereof varies at a high speed. At that time, since one end of the vibrator 235 is held by and fixed to the support plate 240 and the end face of the other end is in contact with the outer surface of the side plate portion 231b on the outside of the cover member 231, the vibrator 235 extends and contracts at the other end, thereby vibrating the cover member 231 little by little.

The vibration of the cover member 231 by the vibration part 232 is performed equally in both of the pair of cover members 231 and 231. At that time, in particular, in this embodiment, the winding directions of the conducting wires are reversed in the vibration part coil 233 which is connected to the side of the cover member 231 on one side and the vibration part coil 233 which is connected to the side of the cover member 231 on the other side. For this reason, the phases of AC power (AC voltage) which is generated in the vibration part coils 233 are reversed in the vibrator 235 which is provided at the cover member 231 on one side and the vibrator 235 which is provided at the cover member 231 on the other side.

Therefore, when the vibrator 235 on one side extends, the vibrator 235 on the other side is shortened, and conversely, when the vibrator 235 on one side is shortened, the vibrator 235 on the other side extends. In this way, the pair of cover members 231 and 231 are displaced together in the same direction. That is, when the cover member 231 on one side is displaced in the rightward direction in FIG. 5A, the cover member 231 on the other side is also displaced in the rightward direction in FIG. 5A, and when the cover member 231 on one side is displaced in the leftward direction in FIG. 5A, the cover member 231 on the other side is also displaced in the leftward direction in FIG. 5A. Therefore, the pair of cover members 231 and 231 are integrally displaced, and therefore, the cover 230 smoothly vibrates, and thus it is possible to easily drop the foreign object 250 placed on the cover 230 from the cover 230.

In this manner, in the wireless power-transmitting system 23 of this embodiment, the cover 230 includes the pair of cover members 231 and 231 is provided to cover the power-transmitting coil 215, and the vibrators 232, which are vibrated by the magnetic flux 2A generated in the power-transmitting coil 215, thereby vibrating the cover 230, are connected to the cover members 231 and 231. Since the cover 230 is vibrated by using the magnetic flux generated in the power-transmitting coil 215, a dedicated power source is not required, and therefore, the apparatus becoming complicated due to the disposition of a dedicated power source, or an increase in apparatus cost due to the use of a dedicated power source is prevented. For this reason, the foreign object 250 placed on the cover 230 and therefore, placed above the power-transmitting coil 215 through the cover 230 can be reliably removed from the cover 230 by dropping the foreign object 250 from the cover member 231 by moving the foreign object 250 to the outside which is the lower side in the inclination direction of the cover member 231 by the vibration of the vibrator 235 of the vibration part 232 having a relatively simple configuration. Therefore, a decrease in the transmission (power transmission) efficiency of the power-transmitting coil 215 due to the foreign object 250 can be prevented with a relatively simple configuration without using a separate dedicated power source.

In particular, the upper surface of each of the cover members 231 and 231 configuring the cover 230 is made to be an inclined surface which descends toward the outside thereof, and therefore, it is possible to drop the foreign object 250 from the cover member 231 by easily moving the foreign object 250 to the outside which is the lower side in the inclination direction of the cover member 231 by the vibration of the vibration part 232.

Further, as the vibrator 235 of the vibration part 232, the pair of electrically conductive polymer actuators 236 and 236 is used. The electrically conductive polymer actuators 236 and 236 are driven at a low voltage, and therefore, the vibrator 235 is easily driven by electric power obtained in the vibration part coil 233, thereby vibrating the cover members 231 and 231. Further, the electrically conductive polymer actuator 236 is much more lightweight than a motor or the like, and therefore, mounting on the cover member 231 (the cover 230) becomes easy.

Fourth Embodiment

Figure 7:
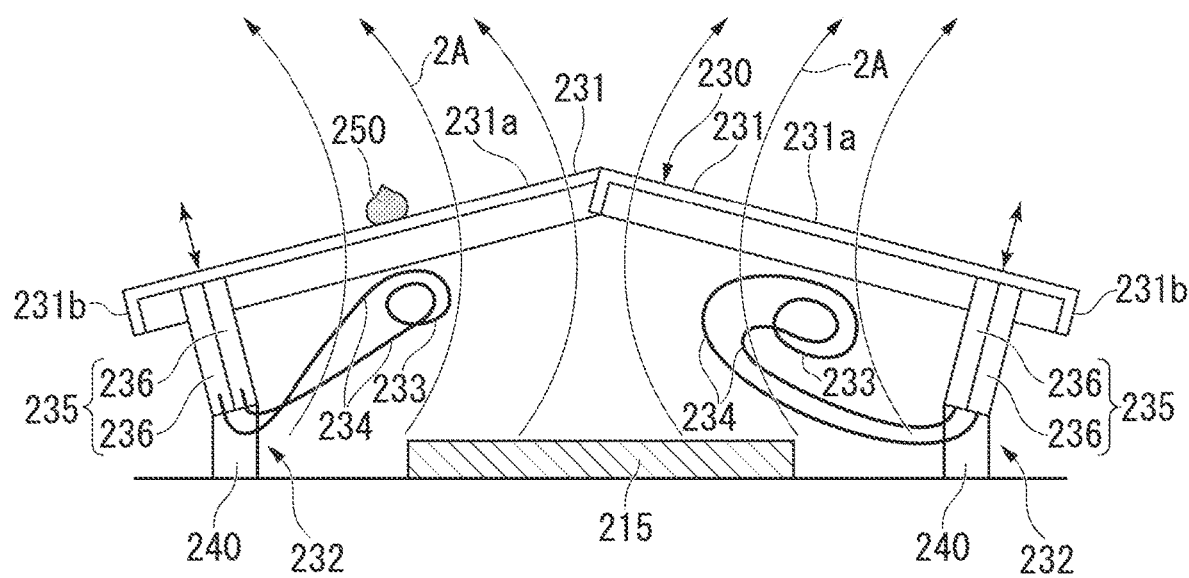
FIG. 7 is a side view of a main section of a fourth embodiment of the wireless power-transmitting system according to the present disclosure.

FIG. 7 is a side view of a main section of a fourth embodiment of the wireless power-transmitting system according to the present disclosure. The wireless power-transmitting system shown in FIG. 7 is different from the wireless power-transmitting system 23 of the third embodiment shown FIGS. 4 and 5A in terms of how to mount the vibrators 235 on the cover members 231 and 231 (the cover 230).

That is, in this embodiment, as shown in FIG. 7, one end of the vibrator 235 includes the pair of electrically conductive polymer actuators 236 and 236 is held by the support plate 240 erected on the ground and the end face of the other end comes into contact with and is connected to the bottom surface of the cover main body 231a of the cover member 231.

Therefore, in this embodiment, the vibration part coil 233 receives a magnetic field (the magnetic flux 2A) corresponding to AC power (high-frequency power) which is emitted from the power-transmitting coil 215, thereby supplying high-frequency AC power to the vibrator 235, whereby the vibrator 235 vibrates the cover main body 231a in the vertical direction.

Therefore, also in the wireless power-transmitting system of this embodiment, it is possible to reliably remove the foreign object 250 placed on the cover 230 from the cover 230 by dropping the foreign object 250 from the cover member 231 by moving the foreign object 250 to the outside which is the lower side in the inclination direction of the cover member 231 by the vibration of the vibrator 235 of the vibration part 232 having a relatively simple configuration. Therefore, a decrease in the transmission (power transmission) efficiency of the power-transmitting coil 215 due to the foreign object 250 can be prevented with a relatively simple configuration without using a separate dedicated power source.

Fifth Embodiment

Figure 8:
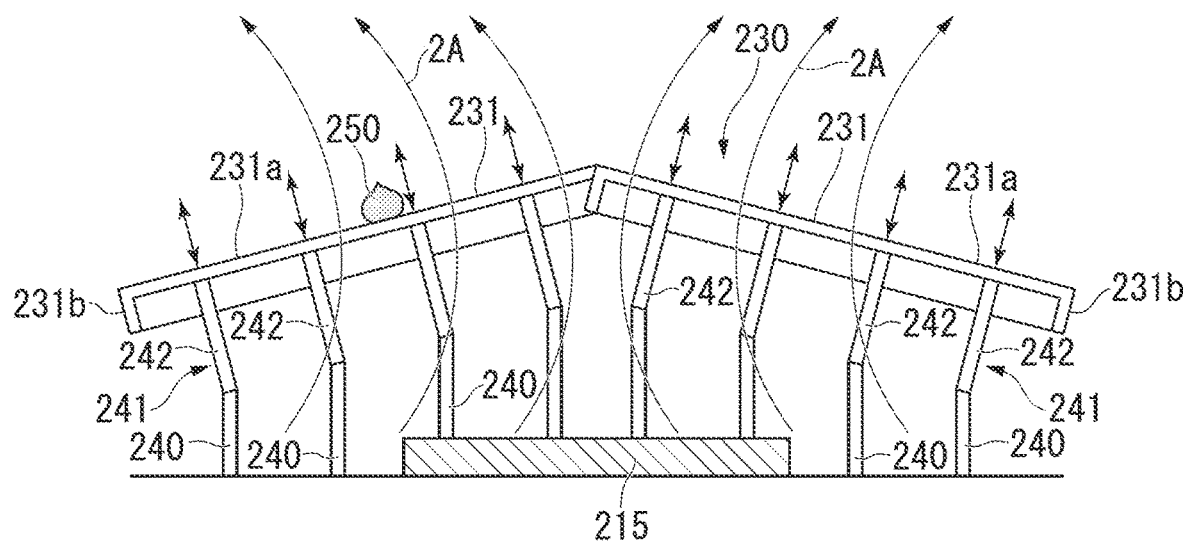
FIG. 8 is a side view of a main section of the fifth embodiment of the wireless power-transmitting system according to the present disclosure.

FIG. 8 is a side view of a main section of a fifth embodiment of the wireless power-transmitting system according to the present disclosure. The wireless power-transmitting system shown in FIG. 8 is different from the wireless power-transmitting system of the fourth embodiment shown FIG. 7 in terms of the configuration of a vibration part which is connected to the cover members 231 and 231 (the cover 230). That is, in this embodiment, a vibrator 242 made of magnetostrictive material is used in a vibration part 241.

As the magnetostrictive material, cobalt or nickel which is a ferromagnetic body, alloys of these, or the like is used. Such magnetostrictive material extends and contracts by causing a dimensional change if a magnetic field is applied. Therefore, the vibrator 242 is formed using such magnetostrictive material so that a direction extending and contracting due to a magnetic field is a length direction. Then, the vibrator 242 is disposed so that one end thereof is held by the support plate 240 erected on the ground and the end face of the other end comes into contact with and is connected to the bottom surface of the cover main body 231a of the cover member 231, similar to the vibrator 235 of the fourth embodiment, and is disposed so as to conform to the direction of the magnetic flux 2A from the power-transmitting coil 215.

Further, in this embodiment, the vibrator 242 directly extends and contracts by the magnetic field (the magnetic flux 2A) from the power-transmitting coil 215, and therefore, it is not necessary to use the vibration part coil 233 used in the previous embodiments. That is, the vibrator 242 extends and contracts by receiving the magnetic field (the magnetic flux 2A) corresponding to AC power (high-frequency power) which is emitted from the power-transmitting coil 215, and accordingly, the vibrator 242 vibrates the cover main body 231a in the vertical direction.

Therefore, also in the wireless power-transmitting system of this embodiment, it is possible to reliably remove the foreign object 250 placed on the cover 230 from the cover 230 by dropping the foreign object 250 from the cover member 231 by moving the foreign object 250 to the outside which is the lower side in the inclination direction of the cover member 231 by the vibration of the vibrator 242 of the vibration part 241 having a simple configuration. Therefore, a decrease in the transmission (power transmission) efficiency of the power-transmitting coil 215 due to the foreign object 250 can be prevented with a simple configuration without using a separate dedicated power source.

Further, the vibrator 242 made of magnetostrictive material is used in the vibration part 241, and therefore, it is not necessary to use the vibration part coil 233. Therefore, it is possible to make the configuration of the vibration part 241 simpler.

Modification Example

Figure 9:
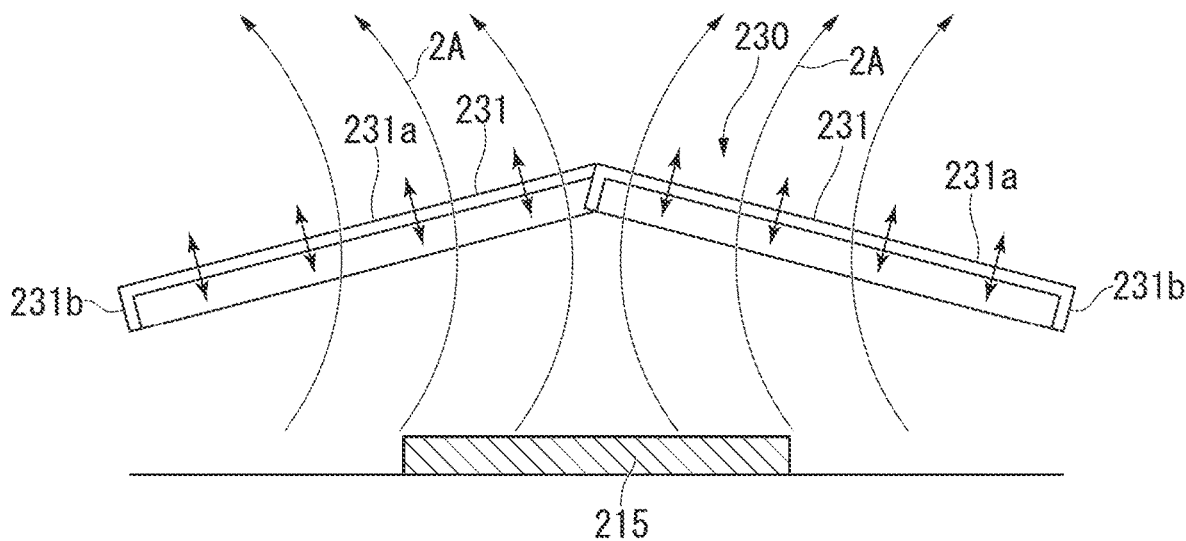
FIG. 9 is a side view of a main section of a modification example of the wireless power-transmitting system according to the present disclosure.

FIG. 9 is a side view of a main section of a modification example of the wireless power-transmitting system according to the present disclosure. The wireless power-transmitting system shown in FIG. 9 has a configuration in which the cover 230 (the cover members 231 and 231) is also used as a vibration part, unlike the previous embodiments. That is, the cover 230 (the cover members 231 and 231) is formed of the magnetostrictive material described above, and therefore, the cover 230 itself extends and contracts by receiving the magnetic field (the magnetic flux 2A) corresponding to AC power (high-frequency power) which is produced from the power-transmitting coil 215, and vibrates in the vertical direction, for example.

Further, in this modification example, the cover 230 (the cover members 231 and 231) is formed of metal which is a magnetostrictive material and is also electrically conductive material, and therefore, when the cover 230 receives a magnetic field (the magnetic flux 2A), an eddy current is generated in the cover 230. Therefore, a slit for cutting off the eddy current is provided in the cover 230 so that the cover does not generate heat due to the eddy current. Further, the cover members 231 and 231 are supported by support members (not shown) above the power-transmitting coil 215 in a state of covering the power-transmitting coil 215.

Also in the wireless power-transmitting system of this modification example, it is possible to reliably remove the foreign object 250 placed on the cover 230 from the cover 230 by dropping the foreign object 250 from the cover member 231 by moving the foreign object 250 to the outside which is the lower side in the inclination direction of the cover member 231 by the cover 230 as a vibration part having a simple configuration. Therefore, a decrease in the transmission (power transmission) efficiency of the power-transmitting coil 215 due to the foreign object 250 can be prevented with a simple configuration without using a separate dedicated power source.

Further, the present disclosure is not limited to the embodiments described above, and various changes can be made within a scope of the present disclosure.

For example, in the embodiments described above, the cover 230 is formed by the pair of cover members 231 and 231 and the cover members 231 and 231 are disposed in a mountain shape. However, for example, a configuration is also acceptable in which the cover member 231 is formed in a triangular shape when viewed in a top view and the cover 230 is formed in a pyramid shape by combining three or more cover members 231.

Further, in the embodiments described above, the upper surface of the cover 230 is made to be an inclined surface. However, the upper surface of the cover 230 may be made to be a horizontal surface, rather than the inclined surface. Also in this case, the cover is vibrated by a vibration part, whereby a foreign object on the cover easily falls and is removed from the cover.

Industrial Applicability

According to the present disclosure, a wireless power-transmitting system is obtained in which it is possible to reliably remove a foreign object placed between a power-transmitting coil and a power-receiving coil.

What is claimed is:

1. A wireless power-transmitting system which wirelessly transmits electric power by making a power-transmitting coil and a power-receiving coil face each other, comprising:
   a cover which is slidable between a closing position at which the cover covers an area above a facing surface of at least one of the power-transmitting coil and the power-receiving coil and an open position at which the cover is retracted from the area above the facing surface; and
   a foreign object accompanying member configured to make a foreign object placed on the cover move together with the cover sliding from the closing position to the open position, wherein
   the foreign object accompanying member is a hook member which is integrally provided at a rear end of the cover and protrudes further upward from a placement surface of the cover on which the foreign object is placed, and
   the hook member is an L-shaped hook.

2. The wireless power-transmitting system according to claim 1, further comprising:
   a winding member configured to wind the cover into a roll shape.

3. A wireless power-transmitting system which wirelessly transmits electric power by making a power-transmitting coil and a power-receiving coil face each other, comprising:
   a cover which is slidable between a closing position at which the cover covers an area above a facing surface of at least one of the power-transmitting coil and the power-receiving coil and an open position at which the cover is retracted from the area above the facing surface;
   a foreign object accompanying member configured to make a foreign object placed on the cover move together with the cover sliding from the closing position to the open position; and
   a folding member configured to fold the cover into a bellows shape.

4. The wireless power-transmitting system according to claim 1, wherein the foreign object accompanying member has a sticking member configured to stick the foreign object to the cover.

5. The wireless power-transmitting system according to claim 1, further comprising:
   a blade member which scrapes off the foreign object stuck to the cover, at an accompanying destination of the foreign object.

6. The wireless power-transmitting system according to claim 1, further comprising:

a foreign object collection member configured to recover the foreign object at an accompanying destination of the foreign object.

7. The wireless power-transmitting system according to claim 3, wherein the foreign object accompanying member has a sticking member configured to stick the foreign object to the cover.

8. The wireless power-transmitting system according to claim 3, further comprising:
a blade member which scrapes off the foreign object stuck to the cover, at an accompanying destination of the foreign object.

9. The wireless power-transmitting system according to claim 3, further comprising:
a foreign object collection member configured to recover the foreign object at an accompanying destination of the foreign object.

10. The wireless power-transmitting system according to claim 1, further comprising:
a housing partitioned into a first space and a second space by a partition portion, the first space being covered by the cover and the power-transmitting coil being accommodated in the first space, the second space being covered by a roof portion, wherein
an upper end portion of the hook member protrudes upward to a position at which the upper end portion is stopped by hitting the roof portion.

* * * * *